US010860878B2

(12) United States Patent
Paul et al.

(10) Patent No.: US 10,860,878 B2
(45) Date of Patent: Dec. 8, 2020

(54) METHOD AND SYSTEM FOR SYNTHESIZING THREE-DIMENSIONAL DATA

(71) Applicant: Wipro Limited, Bangalore (IN)

(72) Inventors: Amrit Paul, Hyderabad (IN); Aluru Sindhuja, Ghaziabad (IN); Raghottam Narayan Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 70 days.

(21) Appl. No.: 16/378,723

(22) Filed: Apr. 9, 2019

(65) Prior Publication Data

US 2020/0265259 A1  Aug. 20, 2020

(30) Foreign Application Priority Data

Feb. 16, 2019  (IN) .............................. 201941006171

(51) Int. Cl.
| | | |
|---|---|---|
| G06K 9/32 | (2006.01) | |
| G06K 9/00 | (2006.01) | |
| G06K 9/62 | (2006.01) | |
| G06N 3/08 | (2006.01) | |
| G06T 7/521 | (2017.01) | |
| G01S 13/89 | (2006.01) | |

(52) U.S. Cl.
CPC ............ G06K 9/3233 (2013.01); G01S 13/89 (2013.01); G06K 9/6218 (2013.01); G06N 3/084 (2013.01); G06T 7/521 (2017.01); G06T 2207/10028 (2013.01)

(58) Field of Classification Search
USPC ......................................... 382/154; 345/419
See application file for complete search history.

(56) References Cited

U.S. PATENT DOCUMENTS

| 9,122,948 B1 | 9/2015 | Zhu et al. |
| 10,297,070 B1 * | 5/2019 | Zhu .......................... G06N 3/08 |

(Continued)

FOREIGN PATENT DOCUMENTS

| JP | 2019002792 A | 1/2019 |
| WO | 2017158058 A1 | 9/2017 |
| WO | 2018002910 A1 | 1/2018 |

OTHER PUBLICATIONS

Ouyang, Z., et al., "A cGANs-based scene reconstructions model using Lidar point cloud", IEEE, 2017, pp. 1107-1114.

*Primary Examiner* — Ishrat I Sherali
(74) *Attorney, Agent, or Firm* — Finnegan, Henderson, Farabow, Garrett & Dunner, LLP

(57) ABSTRACT

This disclosure relates generally to generating synthetic data, and more particularly to method and system for synthesizing three-dimensional (3D) data using generative adversarial networks (GANs). The method may include clustering initial 3D data to identify one or more regions of interest (ROIs), generating an input specific noise data based on the one or more ROIs by an iterative process using Gaussian mixture model, and iteratively synthesizing the 3D data based on the one or more ROIs and the input specific noise data using generative adversarial networks (GANs) to generate final synthesized 3D data. The initial 3D data may represent a given scenario, while the final synthesized 3D data may represent a number of possible scenarios and are affine transforms of the initial 3D data.

20 Claims, 6 Drawing Sheets

(56) References Cited

U.S. PATENT DOCUMENTS

| | | | |
|---|---|---|---|
| 10,489,972 B2* | 11/2019 | Atsmon | G05D 1/0088 |
| 2016/0314224 A1* | 10/2016 | Wei | G06F 30/20 |
| 2018/0314932 A1* | 11/2018 | Schwartz | G06F 7/60 |
| 2018/0341836 A1 | 11/2018 | Lim et al. | |
| 2019/0096035 A1* | 3/2019 | Li | G06T 3/4053 |
| 2019/0228571 A1* | 7/2019 | Atsmon | G06T 19/006 |
| 2019/0272389 A1* | 9/2019 | Viente | H04W 4/44 |
| 2019/0303759 A1* | 10/2019 | Farabet | G06K 9/00791 |
| 2020/0074266 A1* | 3/2020 | Peake | G06K 9/6257 |
| 2020/0160178 A1* | 5/2020 | Kar | G06N 3/08 |
| 2020/0160598 A1* | 5/2020 | Manivasagam | G01S 17/89 |

* cited by examiner

METHOD AND SYSTEM FOR SYNTHESIZING THREE-DIMENSIONAL DATA

TECHNICAL FIELD

This disclosure relates generally to generating synthetic data, and more particularly to method and system for synthesizing three-dimensional (3D) data using generative adversarial networks (GANs).

BACKGROUND

Three-dimensional (3D) data map may represent a scanned environment in 3D, and may find use in a wide variety of computer vision related applications. Such applications include, but may not be limited to, autonomous vehicle navigation, autonomous robotic navigation, 3D reconstruction, computer graphics, video games, virtual reality, object tracking and recognition, and so forth. Typically, 3D data may be acquired by range-imaging devices. However, such data are voluminous and difficult to store for subsequent use. Alternatively, 3D data may be reconstructed from multiple 2D images acquired by multiple 2D imaging devices (e.g., camera). However, such data are still high in volume. Additionally, there is an increased computational complexity while reconstructing the 3D data.

For example, in the development of autonomous vehicles, object detection is an important aspect for detecting and avoiding the obstacles while navigating on roads. Object detection is a process of finding instances of real-world objects such as cars, buses, trucks, pedestrians, bikes, traffic signs, etc. in images or videos. Existing techniques employ one or more imaging devices including, but not limited to, infrared (IR) camera, RGB camera, or light detection and ranging (LiDAR) sensors so as to acquire image of the environment for object detection. However, IR camera or RGB camera acquire 2D images and, with ill-suited lighting conditions, it becomes difficult to detect objects due to less gradient and depth information. There may be a need to use different camera input feeds such as RGB camera for day lighting condition or IR camera for night lighting condition. However, this may require different object detection algorithms, thereby increasing computational complexity. Moreover, to perform 360 degree object detection, input feeds from multiple cameras need to be fused together, Again, this may increase computational complexity and latency of the system.

As stated above, the LiDAR may acquire 3D data that may be used for object detection. However, LiDAR data are not only voluminous, but also difficult and costly to acquire for a number of scenarios. As will be appreciated, there may be a need for massive amounts of data to train an artificial neural network (ANN) based object detection model. A fusion of LiDAR and camera may be employed to generate required data for object detection. However, the acquired data may still be voluminous. Further, such data may include annotated labelled boxes (2D/3D) and a 3D point cloud annotation that may be given to the camera and the LiDAR sensor, respectively. But, due to the difference in the formats of data from LiDAR sensor and camera, there may be a complexity to integrate data from these separate imaging devices. Moreover, if one of these imaging devices fail, the entire algorithm may fail.

SUMMARY

In one embodiment, a method for synthesizing three-dimensional (3D) data representing a plurality of possible scenarios from initial 3D data representing a given scenario is disclosed. In one example, the method may include clustering the initial 3D data to identify one or more regions of interest (ROIs). The method may further include generating input specific noise data based on the one or more ROIs by an iterative process using Gaussian mixture model. The method may further include iteratively synthesizing 3D data based on the one or more ROIs and the input specific noise data using generative adversarial networks (GANs) to generate final synthesized 3D data. The final synthesized 3D data may represent the plurality of possible scenarios and may be affine transforms of the initial 3D data.

In one embodiment, a system for synthesizing 3D data representing a plurality of possible scenarios from initial 3D data representing the given scenario is disclosed. In one example, the system may include a data synthesis device that may include at least one processor and a computer-readable medium communicatively coupled to the at least one processor. The computer-readable medium may store processor-executable instructions, which, on execution, may cause the processor to cluster the initial 3D data to identify one or more ROIs. The processor-executable instructions, on execution, may further cause the processor to generate input specific noise data based on the one or more ROIs by an iterative process using Gaussian mixture model. The processor-executable instructions, on execution, may further cause the processor to iteratively synthesize 3D data based on the one or more ROIs and the input specific noise data using GANs to generate final synthesized 3D data. The final synthesized 3D data may represent the plurality of possible scenarios and may be affine transforms of the initial 3D data.

In one embodiment, a non-transitory computer-readable medium storing computer-executable instruction for synthesizing 3D data representing a plurality of possible scenarios from initial 3D data representing the given scenario is disclosed. In one example, the stored instructions, when executed by a processor, may cause the processor to perform operations including clustering the initial 3D data to identify one or more ROIs. The operations may further include generating input specific noise data based on the one or more ROIs by an iterative process using Gaussian mixture model. The operations may further include iteratively synthesizing 3D data based on the one or more ROIs and the input specific noise data using GANs to generate final synthesized 3D data. The final synthesized 3D data may represent the plurality of possible scenarios and may be affine transforms of the initial 3D data.

It is to be understood that both the foregoing general description and the following de a led description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description may be considered as exemplary only, with the true scope and spirit being indicated by the following claims.

Figure 1:
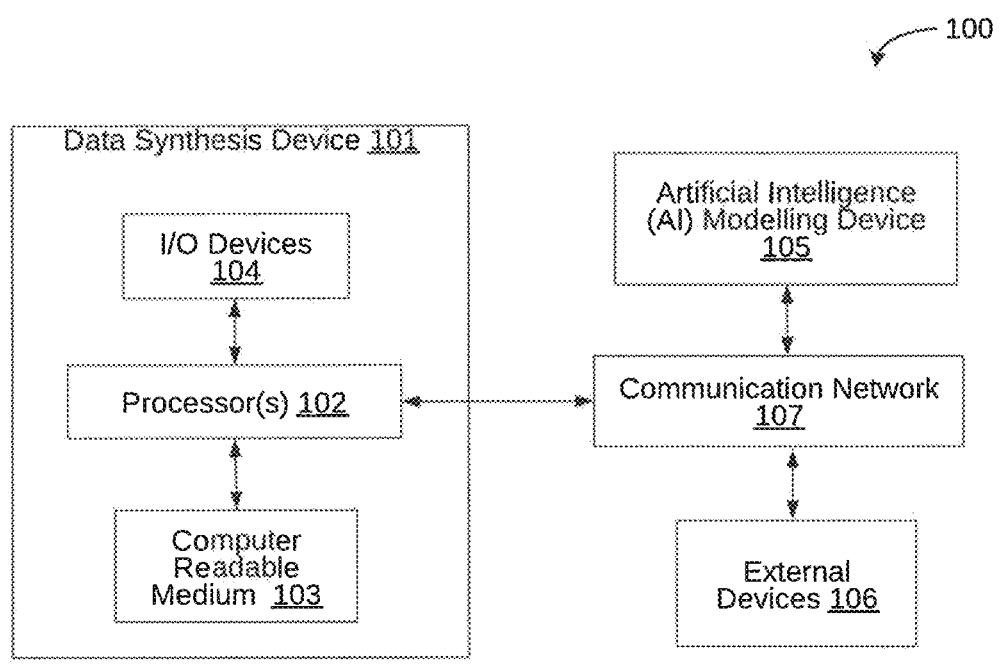
FIG. 1 is a block diagram of an exemplary system for synthesizing three-dimensional (3D) data, in accordance with some embodiments of the present disclosure.

Referring now to FIG. 1, an exemplary system 100 for synthesizing three-dimensional (3D) data, is illustrated, in accordance with some embodiments of the present disclosure. As will be appreciated, the system 100 may implement a data synthesis device 101 so as to synthesize new 3D data from an initial or input 3D data. Further, the system may implement an artificial intelligence (AI) modelling device 105 so as to build, train, and implement an AI model using original 3D data and newly synthesized 3D data. In some embodiments, the AI model may be trained to perform recognition, classification, or any other data prediction. For example, the AI model may be trained for object classification and localization for use in autonomous navigation application. As will be appreciated, the data synthesis device 101 or the AI modelling device 105 may be any computing device (for example, server, desktop, laptop, notebook, netbook, tablet, smartphone, mobile phone, or the like).

As will be described in greater detail in conjunction with FIGS. 2-5, the data synthesis device 101 may synthesize the new 3D data from the initial 3D data by clustering the initial 3D data to identify one or more regions of interest (ROIs), generating input specific noise data based on the one or more ROIs by an iterative process using Gaussian mixture model, and iteratively synthesizing the 3D data based on the one or more ROIs and the input specific noise data using generative adversarial networks (GANs) to generate final synthesized 3D data. It should be noted that the initial 3D data represent a given scenario, while the final synthesized 3D data represent a plurality of possible scenarios and are affine transforms of the initial 3D data.

The data synthesis device 101 may include one or more processors 102, a computer-readable medium (for example, a memory) 103, and an input/output (I/O) device 104. The computer-readable medium 103 may store instructions that, when executed by the one or more processors 102, cause the one or more processors 102 to synthesize 3D data from the initial 3D data, in accordance with aspects of the present disclosure. The computer-readable medium 103 may also store various data (for example, initial 3D data, synthesized 3D data, ROIs, input specific noise data, GANs model, final synthesized 3D data, down sampled data, AI model, Eigen values, embedding vectors, a set of classes for identified ROIs, a set of feature vectors, and the like) that may be captured, processed, and/or required by the data synthesis device 101. The data synthesis device 101 may interact with a user via a user interface accessible via the I/O devices 104. The data synthesis device 101 may also interact with one or more external devices 106 or with the AI modelling device 105 over a communication network 107 for sending or receiving various data. The external devices 106 may include, but may not be limited to, a remote server, a digital device, or another computing system.

Figure 2:
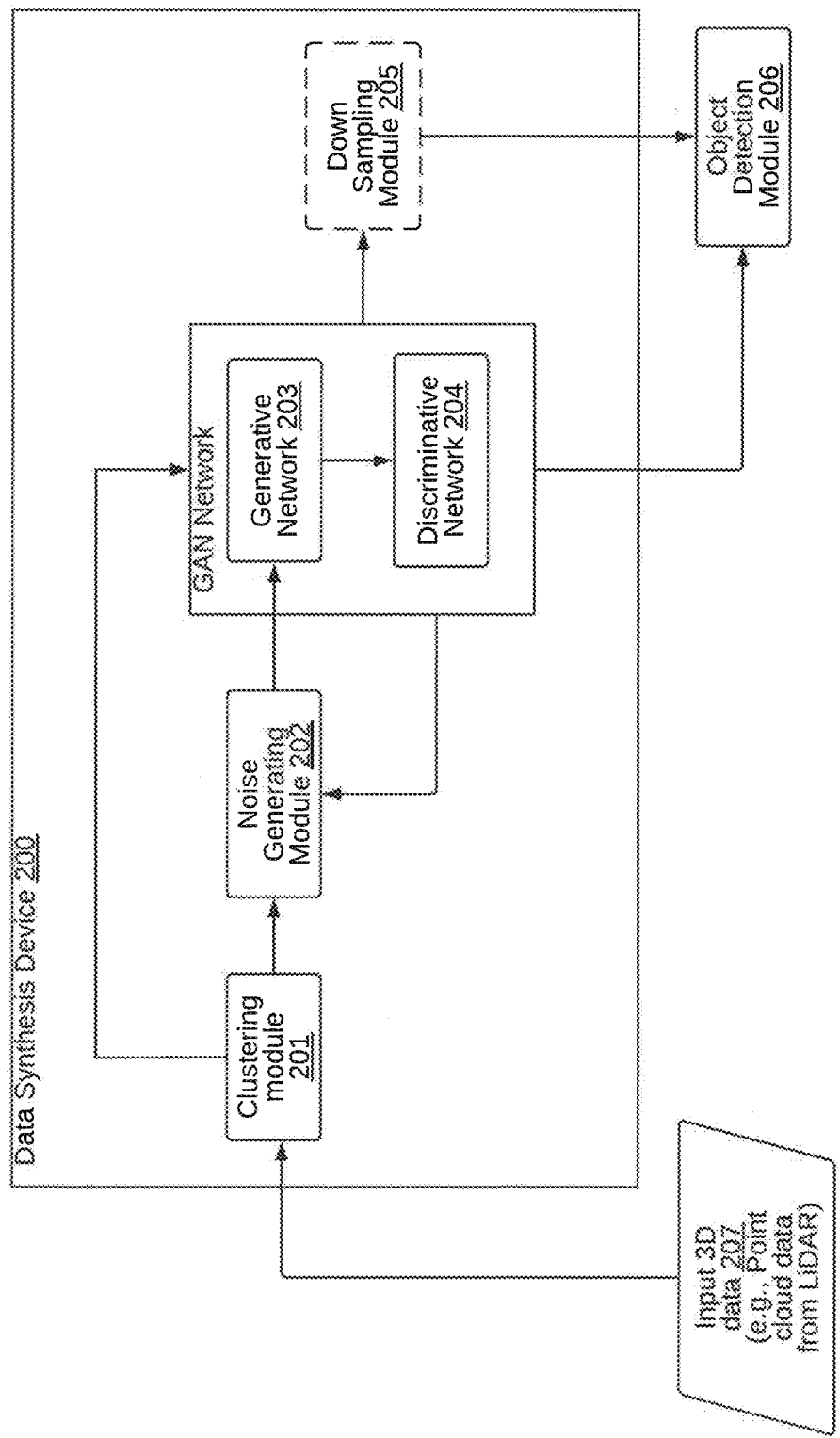
FIG. 2 is a functional block diagram of a data synthesis device, in accordance with some embodiments of the present disclosure.

Referring now to FIG. 2, a functional block diagram of a data synthesis device 200, implemented by the system 100 of FIG. 1, is illustrated, in accordance with some embodiments of the present disclosure. The data synthesis device 200 may include various modules that perform various functions so as to synthesize new 3D data from initial 3D data. In some embodiments, the data synthesis device 200 may include a clustering module 201, a noise generating module 202, a generative network 203, and a discriminative network 204. In some embodiments, the data synthesis device 200 may further include a down sampling module 205. It should be noted that the generative network 203 and the discriminative network 204 may be combinedly referred to as generative adversarial networks (GANs), Further, it should be noted that, in some embodiments, the GANs or the optional down sampling module 205 may provide the synthesized 3D data to an object detection module 206 for subsequent use. Moreover, it should be noted that the 3D data may be point cloud data acquired by light detection and ranging (LiDAR) sensor. As will be appreciated by those skilled in the art, all such aforementioned modules 201-205 may be represented as a single module or a combination of different modules. Moreover, as will be appreciated by those skilled in the art, each of the modules 201-205 may reside, in whole or in parts, on one device or multiple devices in communication with each other.

The clustering module 201 may receive input 3D data (also referred to as initial 3D data) 207. For example, the clustering module 201 may receive point cloud data acquired by the LIDAR sensor. It should be noted that the input 3D point cloud data may represent a given scenario. The clustering module 201 may then cluster the input 3D data 207 to identify the one or more ROIs. The ROIs may include, but may not be limited to, humans, vehicles, pedestrians, sidewalks, poles, trees, signage, and so forth. In some embodiments, a semi-supervised learning algorithm may be employed for performing clustering of the input 3D data 207. A minimum of 10-20 scale-variant samples may be manually annotated with their bounding boxes for defining the ROIs to facilitate learning in the semi-supervised learning algorithm. The clustering module 201 may then provide the identified ROIs to the GANs and to the noise generating module 202.

The noise generating module 202 may receive the identified ROIs from the clustering module 201. The noise generating module 202 may then generate input specific noise data based on the identified ROIs by an iterative process using Gaussian mixture model. In particular, the noise generating module 202 may generate input specific noise data by computing multi-variate Gaussian distribution of the identified ROIs and deriving prior probability for the computed multi-variate Gaussian distribution. The noise generating module 202 may then provide the generated input specific noise data to the GANs. The GANs may synthesize new 3D data based on the generated input specific noise data and the identified ROIs. The GANs may then back-propagate any error (i.e., any difference between the synthesized 3D data and input 3D data 207) to the noise generating module 202. The noise generating module 202 may then generate updated input specific noise data and feed it again to GANs, which may then synthesize new 3D data. The process may reiterate until final synthesized 3D data are affine transforms of the input 3D data 207. In other words, the process may reiterate until the final synthesized 3D data are indistinguishable from the input 3D data 207.

The generative network 203 may receive the input specific noise data from the noise generating module 202 and the identified ROIs from the clustering module 201. The generative network 203 may then synthesize new 3D data by using the input specific noise data and the identified ROIs. As will be appreciated, instead of using random noise data that is independent of the input 3D data 207, herein the generative network 203 synthesize 3D data based on the input specific noise data generated from the input 3D data 207. The generative network 203 may further provide the synthesized 3D data to the discriminative network 204.

The discriminative network 204 may receive the synthesized 3D data from the generative network 203. The discriminative network 204 may then compare the synthesized 3D data with the identified ROIs. If the synthesized 3D data are different from the clustered input data, the discriminative network 204 may back propagate an error (i.e., difference) to the noise generating module 202. As stated above, the noise generating module 202 may then generate updated input specific noise data and feed it again to GANs. It should be noted that this process may iteratively continue till the discriminative network 204 is unable to distinguish between the synthesized 3D data and the identified ROIs of the input 3D data 207. As will be appreciated, the generative network 203 and the discriminative network 204 may be continuously trained till the generative network 203 produces the new 3D data resembling the original 3D data (i.e., input 3D data 207) such that the discriminative network 204 is unable to differentiate the new 3D data from the original 3D data.

Thus, the GANs (i.e., the generative network 203 and the discriminative network 204) may generate final synthesized 3D data that are affine transforms of the input 3D data 207. Further, it should be noted that the final synthesized 3D data may represent a number of possible scenarios that are distinct from each other and from the given scenario of the input 3D data 207. The final synthesized data may be stored and provided for subsequent processing.

As will be appreciated, the input 3D data 207 may be low definition (i.e., low resolution) data or high definition (high resolution) data. For example, the input point cloud data from a high order LiDAR sensor (for example, HDL-64) is high definition data, while that from lower resolution LiDAR sensor (for example, VLP 32) is low definition data. The final synthesized data may be of low definition data or high definition data based on quality of the input 3D data 207 processed by the data synthesis device 200. Thus, the final synthesized data will be low definition data if the input 3D data 207 are low definition data. Similarly, the final synthesized data will be high definition data if the input 3D data 207 are high definition data. Further, as will be appreciated, if the final synthesized data are a high definition data, it may be down sampled to low definition data based on subsequent requirement. In such embodiments, the down sampling module 205 may be employed to down sample the high definition final synthesized data. The down sampling module 205 may receive the final synthesized 3D data from the GANs and may then down sample the final synthesized 3D data. In some embodiments, the down sampling module 205 may down sample the final synthesized 3D data by using the voxel grid filters. As will be appreciated, the voxel grid filters may reduce the number of data-points in the 3D data such that remaining data points may best represent the input 3D data 207 as a whole. In some embodiments, the voxel grid filters may reduce the number of data-points by taking a centroid or spatial average of the data points in the 3D data, or by taking the geometrical center of the voxel.

The final synthesized data may be provided for subsequent processing either directly from the GAN's (i.e., without down sampling) or from the down sampling module 205 (i.e., upon down sampling). For example, the final synthesized 3D data may be employed for training an AI model such as an artificial neural network (ANN) based object detection model or any other application. It should be noted that the down sampling may enable the final synthesized 3D data to be compatible with applications where the operational input 3D data may be low definition 3D data (for example, from lower resolution LiDAR sensor such as VLP 32).

As stated above, in some embodiments, the final synthesized 3D data may be employed for training an object detection model. The object detection module 206 may implement the object detection model for object classification and localization for use in autonomous navigation application. As will be appreciated, the object detection model may be a machine learning model or a deep learning model. The object detection model may detect instances of semantic objects of a certain class (such as humans, buildings, signage, or vehicles) in digital images and videos. For example, the object detection model may detect instances of real-world objects such as cars, buses, trucks, pedestrians, bikes, traffic signs, or the like so as to avoid these obstacles while navigating on roads. Herein, the object detection module 206 may receive the final synthesized 3D data either from GANs or down sampling module 205. The object detection module 206 may then derive embedded vectors based on L2 Norms for use by the object detection model.

It should be noted that the data synthesis device 200 may be implemented in programmable hardware devices such as programmable gate arrays, programmable array logic, programmable logic devices, and so forth. Alternatively, the data synthesis device 200 may be implemented in software for execution by various types of processors. An identified device of executable code may, for instance, include one or more physical or logical blocks of computer instructions which may, for instance, be organized as an object, procedure, function, module, or other construct. Nevertheless, the executables of an identified system need not be physically located together but may include disparate instructions stored in different locations which, when joined logically together, include the device and achieve the stated purpose of the device. Indeed, a device of executable code could be a single instruction, or many instructions, and may even be distributed over several different code segments, among different applications, and across several memory devices.

As will be appreciated by one skilled in the art, a variety of processes may be employed for synthesizing three-dimensional (3D) data. For example, the exemplary system 100 and the associated data synthesis device 200 may synthesize the 3D point cloud data using initial 3D data by the processes discussed herein. In particular, as will be appreciated by those of ordinary skill in the art, control logic and/or automated routines for performing the techniques and steps described herein may be implemented by the system 100 and the data synthesis device 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
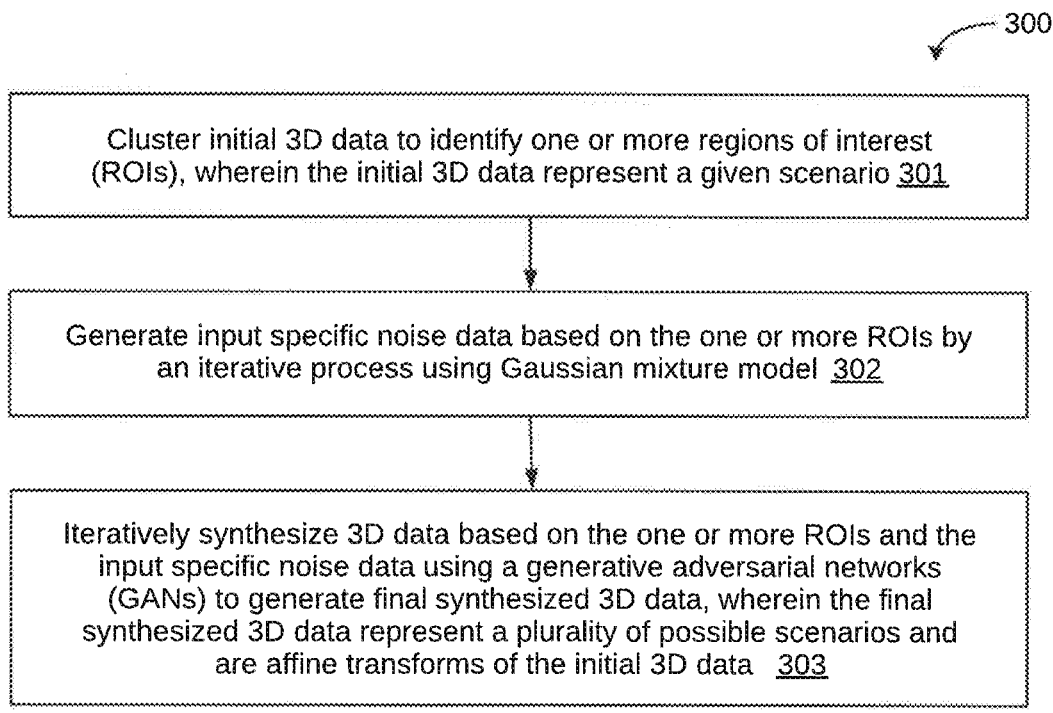
FIG. 3 is a flow diagram of an exemplary process for synthesizing 3D data, in accordance with some embodiments of the present disclosure.

For example, referring now to FIG. 3, exemplary control logic 300 for synthesizing 3D data via a system, such as the system 100, is depicted via a flowchart, in accordance with some embodiments of the present disclosure. As illustrated in the flowchart, the control logic 300 may include the step of clustering initial 3D data to identify one or more ROIs at step 301. It should be noted that the initial 3D data may represent a given scenario. The control logic 300 may further include the steps of generating input specific noise data based on the one or more ROIs by an iterative process using Gaussian mixture model at step 302, and iteratively synthesizing 3D data based on the one or more ROIs and the input specific noise data using GANs so as to generate final synthesized 3D data at step 303. It should be noted that the final synthesized 3D data may represent a plurality of possible scenarios and may be affine transforms of the initial 3D data.

In some embodiments, the initial 3D data may be a point cloud data acquired by LiDAR sensor (for example VLP-64/32/16, HDL-64, or the like). Additionally, in some embodiments, the initial 3D data are a high definition data. In such embodiments, the control logic 300 may further include additional step of down sampling the final synthesized 3D data using one or more voxel grid filters.

In some embodiments, the control logic 300 may further include the step of training an AI model with the final synthesized 3D data. In such embodiments, the AI model may be trained for object classification and localization for use in autonomous navigation application. Moreover, in such embodiments, the control logic 300 may further include the steps of determining Eigen values for the final synthesized 3D point cloud data using singular value decomposition, and computing embedding vector for the final synthesized 3D data based on the Eigen values.

In some additional embodiments, generating the input specific noise data at step 302 may further include the step of computing multi-variate Gaussian distribution of the one or more ROIs based on a set of feature vectors for the one or more ROIs. In such embodiments, generating the input specific noise data at step 302 may further include the step of deriving prior probability for the multi-variate Gaussian distribution of the one or more ROIs based on a set of classes for the one or more ROIs and the set of feature vectors for the one or more ROIs, Additionally, in such embodiments, generating the input specific noise data at step 302 may further include the step of iteratively back-propagating the 3D data to generate updated input specific noise data.

Figure 4:
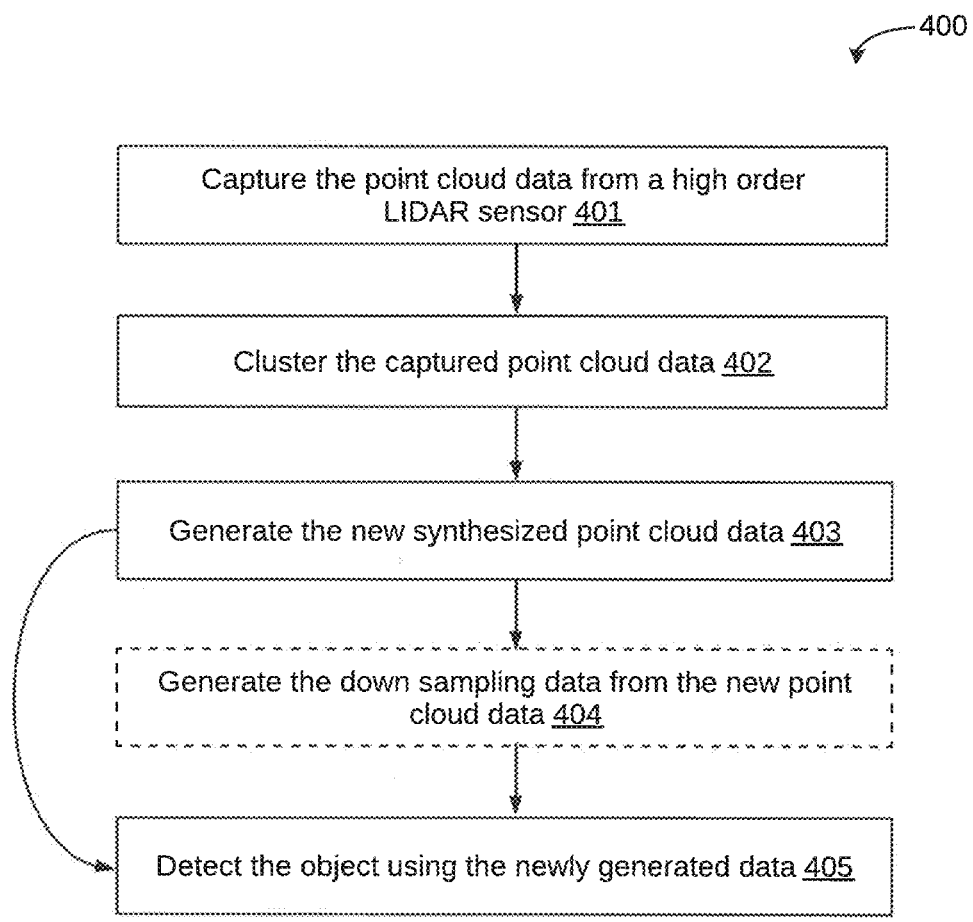
FIG. 4 is a flow diagram of a detailed exemplary process for synthesizing point cloud data, in accordance with some embodiments of the present disclosure.

Referring now to FIG. 4, an exemplary process 400 for synthesizing 3D data, such as point cloud data, is depicted in greater detail via a flowchart, in accordance with some embodiments of the present disclosure. At step 401, a high order LiDAR sensor may capture point cloud data of an environment. Further, at step 402, the clustering module 201 may cluster the captured point cloud data into one or more ROIs. The clustering module 201 may then feed the identified ROIs to the noise generating module 202 and to the GANs (i.e., the generative network 203 and the discriminative network 204). Further, at step 403, the GANs may generate the new synthesized point cloud data. In some embodiment, the new synthesized point cloud data may be required to be of low definition for subsequent processing. In such embodiments, the GANs may feed the new synthesized point cloud data to the down sampling module 205. Further, in such embodiments, at step 404, the down sampling module 205. may generate the down sampling data from the new synthesized point cloud data. The down sampling module 205 may then feed the down sampled data to the object detection module 206. Alternatively, in some embodiments, the new synthesized point cloud data may be required to be in high definition for subsequent processing. In such embodiments, the GANs may directly feed the new synthesized point cloud data to the object detection module 206. Further, at step 405, the object detection module 206 may detect the object using the newly generated point cloud data. Each of these steps will be described in greater detail below.

At step 401, the high order LiDAR sensor (for example, VLP-64, HDL-64, or the like) may capture the point cloud data of an environment. It should be noted that the point cloud data may represent a scenario of the environment. The captured point cloud data (i.e., input or initial point cloud data) may be used to produce new similar point cloud data, which may be used for training the object detection model for object recognition, classification, or localization. In particular, the captured point cloud data may be fed to the clustering module 201.

At step 402, the clustering module 201 may cluster the captured point cloud data into one or more ROIs. The clustering module 201 may employ a machine learning algorithm for clustering the point cloud data. The machine learning algorithm may employ a semi-supervised learning where there is no need for labelling all the training samples manually. A minimum of 10-20 scale-variant samples may be manually annotated. The samples may be manually annotated with their bounding boxes for defining the one or more ROIs. As will be appreciated, any standard clustering algorithm such as expectation maximum clustering algorithm may be used to automatically label the samples to the corresponding classes. It may be noted that the identified ROIs may then be used to produce new point cloud data. The clustering module 201 may then feed the identified ROIs to the noise generating module 202 and to the GANs.

At step 403, the noise generating module 202 in conjunction with the GANs may generate new synthesized point cloud data based on the identified ROIs. Conventional techniques to generate new point cloud data involves feeding a variable noise data along with the initial point cloud data as input to the GANs, which may then produce new point cloud data. However, as will be described in greater detail below, the present disclosure synthesizes new point cloud data using input specific noise data. In other words, instead of using random noise data that is independent of the initial or input point cloud data, the present disclosure uses input specific noise data that may be generated from the clustered point cloud data (i.e., identified ROIs) itself by the noise generating module 202. The input specific noise data may be generated as follows:

Initially, a distribution of the input specific noise data to be generated may be assumed to be multi variate Gaussian distribution, which may be represented as per the equation (1) below:

$$N(x|\mu, \varepsilon) = \frac{1}{\sqrt{(2\pi|\varepsilon|)}} \exp\left(-\frac{1}{2}(x-\mu)^T \varepsilon^{-1}(x-\mu)\right) \quad \text{Equation (1)}$$

It should be noted that, in Equation (1), N $(x|\mu, \varepsilon)$ represents multi variate Gaussian distribution, which may be a generalization of the univariate normal distribution with a probability density function (PDF). Further, x represents the feature vectors of the clustered point cloud data (i.e., identified ROIs), μ represents the mean of the multi variate Gaussian distribution, and ε represents the covariance matrix of the feature vectors of the clustered point cloud data (i.e., identified ROIs).

Next, prior probability for the distribution of the input specific noise data may be calculated using PDF as per the equation (2) below:

$$P(x) = \sum_{k=1}^{k} \pi_k N(x|\mu_k, \varepsilon_k) = W_k \exp\left(\frac{(x-\mu_k)^2}{2\sigma_k^2}\right) \quad \text{Equation (2)}$$

It should be noted that, in Equation (2), P(x) represents the prior probability derived for the distribution of the input specific noise data, W represents a weight assigned to each class of the clustered point cloud data (i.e., identified ROIs), k represents the number of classes present in the clustered point cloud data (i.e., identified ROIs), x represents the feature vectors of the clustered point cloud data (i.e., identified ROIs), μ represents the mean of the multi variate Gaussian distribution, and σ represents the standard deviation of the multi variate Gaussian distribution. As will be appreciated, initially, the weights (W) may be assumed randomly and the prior probability may be calculated accordingly.

The calculated input specific noise data (i.e., prior probability) may be fed to the GANs for further processing, which, in turn, may generate new point cloud data (also referred to as synthetic data). The generative network 203 of the GANs may receive two inputs—identified ROIs by the clustering module 201 and the calculated input specific noise data (i.e., prior probability) by the noise generating module 202. As will be appreciated, the generative network 203 may generate the synthetic data containing translation, rotation, and scale-variance (i.e., affine transforms) based on various characteristics of the identified ROIs and the input specific noise data. The synthetic data generated by the generative network 203 may then be fed to the discriminative network 204 of the GANs.

As will be appreciated, the discriminative network 204 may distinguish between the real point cloud data (also referred to as authentic, original, input point cloud data) and synthetic point cloud data. In particular, the discriminative network 204 may compare the synthetic data with the input point cloud data so as to calculate an error (i.e., a difference). In some embodiments, the error may be calculated by calculating PDF for each 'k' class with a given probability of total clustered point cloud data as per the equation (3) below:

$$P(k|x) = \frac{P(x|k) \cdot P(k)}{P(x)} = \frac{\left(\left(\sum_{k=1}^{k} \pi_k N(X|\mu_k, \varepsilon_k)\right)(\pi_k)\right)}{\sum_{i=1}^{k} \pi_i N(X|\mu_i, \varepsilon_i)} \quad \text{Equation (3)}$$

It should be noted that, in equation (3), P(k|x) represents the prior probability for each 'k' class given the probability of total clustered point cloud data, P(x|k) represents prior probability given the probability of 'k' class, and P(k) represents the probability of 'k' class.

Further, it should be noted that, if error (i.e., difference) exists, then the error may be back propagated to the noise generating module 202. On receiving the error sent by the discriminative network 204, the noise generating module 202 may update the weight (W) assigned to each class of the identified ROIs and may calculate prior probability as per Equation (2) based on the updated weights (W). As will be appreciated, the updated prior probability (i.e., updated input specific noise data) calculated based on the updated weight (W) may be fed to the generative network 203 and the process may continue iteratively, till the error calculated by the discriminative network 204 becomes negligible (i.e., about zero) and the discriminative network 204 is unable to distinguish between the authentic data and synthetic data. The final synthesized point cloud data may represent a plurality of possible scenarios of the environment. Further, the final synthesized point cloud data may be affine transforms of the initial or input point cloud data. The final synthesized point cloud data may then be sent for further processing (e.g., object detection) either directly or upon down sampling.

In some embodiment, if the final synthesized point cloud data (i.e., synthetic data) may be required to be of low definition, then the discriminative network 204 of the GANs may feed the synthesized point cloud data to the down sampling module 205. For example, the final synthesized point cloud data from the high definition input point cloud data may be high definition itself. Such data may be required to be compatible for application that employs low resolution LiDAR sensors (for example, VLP 32). At step 404, the down sampling module 205. may generate the down sampling data from the final synthesized point cloud data. The down sampling module 205 may employ voxel grid filters to return point cloud data with smaller number of points that best represent the initial or input point cloud as a whole. As will be appreciated, the voxel grid filters may reduce the number of data points in the point cloud data by taking a centroid or spatial average of the data points in the point cloud data, or by taking the geometrical center of the voxel.

However, if the final synthesized point cloud data may be required to be of high definition, then the discriminative network 204 of the GANs may directly feed the final synthesized point cloud data to the object detection module 206.

At step 405, the object detection module 206 may detect the object using the newly generated data (i.e., the final synthesized point cloud data). The object detection module 206 may employ any machine learning algorithm or deep learning algorithm to perform object detection, classification, or localization. It should be noted that the object detection module 206 may be also fed with clustered point cloud data (i.e., identified ROIs). The object detection module 206 may then determine Eigen values for the final synthesized point cloud data as well as for the original point cloud data using singular value decomposition. As will be appreciated, the singular value decomposition may be a factorization of a real or complex matrix. It may be the generalization of the Eigen decomposition of a positive semidefinite normal matrix (for example, a symmetric matrix with positive Eigen values) to any M*N matrix via an extension of a polar decomposition. As will be appreciated, the singular value decomposition comprises all the intuitive interpretations (for example, rotation, scaling, singular values as semi axis of an ellipse or ellipsoid, an orthonormal bases, linearity, or the like). It should be noted that, by using the Eigen values, a new embedding vector for the final synthesized point cloud data may be calculated based on a L2 Norms (also, referred to as Euclidean norm). The L2 Norms may calculate the distance of the vector coordinate from the origin of the vector space, and may produce non-sparse coefficient, thereby enhancing the efficiency of computational calculation. The object detection may be performed using the calculated embedding vector. The object detection module 206 may deal with detecting instances of semantic objects of a certain class (for example humans, buildings, vehicles, signage, or the like) in digital images and videos. Herein, the object detection module 206 may use an embedded vector based on L2 Norms. Additionally, the object detection module 206 may find instances of real-world objects such as cars, buses, trucks, pedestrians, bikes, traffic signs, or the like in the final synthesized point cloud data, which represents the plurality of possible scenarios. Such instances may be used not only for detecting and avoiding the obstacles while navigating on roads, but also for training autonomous vehicle navigation model or the like applications.

Figure 5:
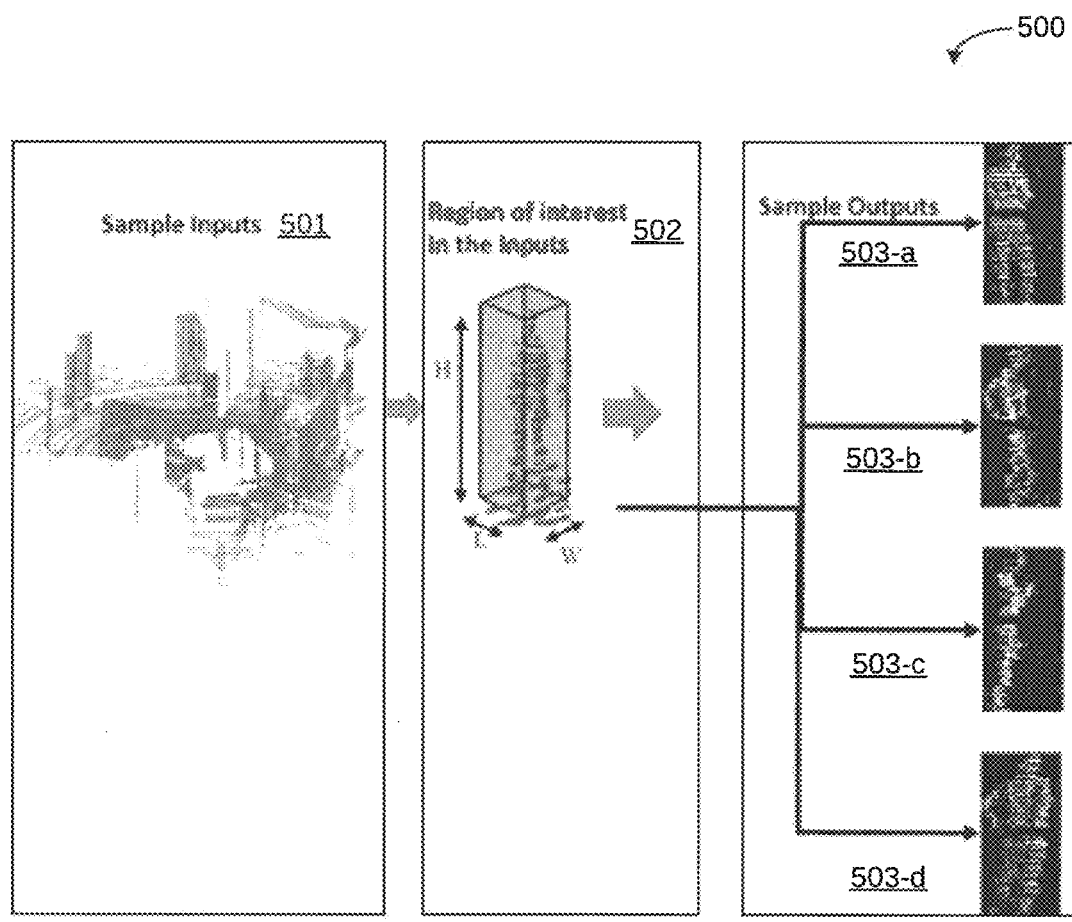
FIG. 5 is an exemplary graphical representation for synthesized point cloud data based on input point cloud data, in accordance with some embodiments of the present disclosure.

Referring now to FIG. 5, an exemplary graphical representation 500 for synthesized point cloud data based on input point cloud data is illustrated, in accordance with some embodiments of the present disclosure. An input point cloud data 501 may be clustered by the clustering module 201 so as to identify one or more ROIs 502. For example, the input point cloud data 501 has a region representing a human, thereby being an identified ROI 502. When the identified ROI 502 is fed to the noise generating module 202 and the GANs, many synthesized point cloud data 503-*a*, 503-*b*, 503-*c*, and 503-*d* may be generated. As will be appreciated, these synthetic point cloud data 503-*a*, 503-*b*, 503-*c*, and 503-*d* may look same as original image and may be considered as the final synthesized point cloud data. Further, it should be noted that the input point cloud data 501 may represent a given scenario (e.g., a given orientation and posture of the human), while the final synthesized point cloud data 503-*a*, 503-*b*, 503-*c*, and 503-*d* may represent a number of possible scenarios (e.g., various possible orientation and/or various possible postures of the human). Also, the final synthesized point cloud data 503-*a*, 503-*b*, 503-*c*, and 503-*d* may be affine transforms of the initial or input point cloud data. As will be appreciated, in the illustrated graphical representation 500, 4 synthetic representations are shown. However, the synthetic data may not be limited to four scenarios and may include less or more number of scenarios.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
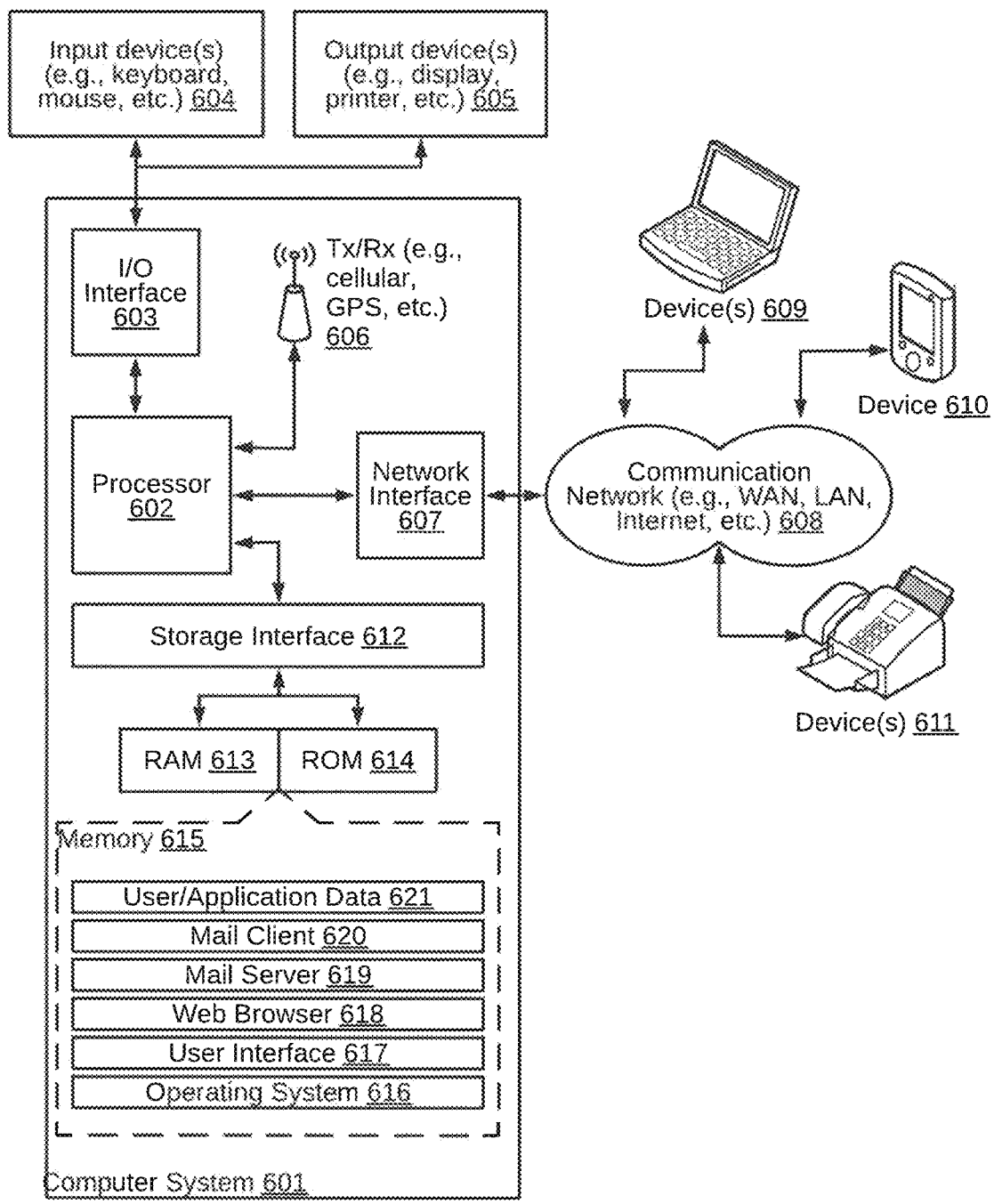
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of the computer system 601 may be used for synthesizing 3D data based on input 3D data using GANs. The computer system 601 may include a central processing unit ("CPU" or "processor") 602. The processor 602 may include at least one data processor for executing program components for executing user-generated or system-generated requests. A user may include a person, a person using a device such as those included in this disclosure, or such a device itself. The processor 602 may include specialized processing units such as integrated system (bus) controllers, memory management control units, floating point units, graphics processing units, digital signal processing units, or the like. The processor 602 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, or the like. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), or the like.

The processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (for example code-division multiple access (CDMA), high-speed packet access (HSPA+), global system for mobile communications (GSM), long-term evolution (LTE), WiMAX, or the like), or the like.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (for example accelerometer, light sensor, GPS, altimeter, gyroscope, proximity sensor, or the like), stylus, scanner, storage device, transceiver, video device/source, visors, or the like. Output device 605 may be a printer, fax machine, video display (for example cathode ray tube (CRT), liquid crystal display (LCD), light-emitting diode (LED), plasma, or the like), audio speaker, or the like. In some embodiments, a transceiver 606 may be disposed in connection with the processor 602. The transceiver 606 may facilitate various types of wireless transmission or reception. For example, the transceiver 606 may include an antenna operatively connected to a transceiver chip (for example TEXAS INSTRUMENTS® WILINK WL1286®, BROADCOM® BCM45501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, or the like.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (for example twisted pair 10/100/1000 Base T), transmission control protocol/internet protocol (TCP/IP), token ring, IEEE 802.11a/b/g/n/x, or the like. The communication network 608 may include, without limitation, a direct interconnection, local area network (LAN), wide area network (WAN), wireless network (for example using Wireless Application Protocol), the Internet, or the like. Using the network interface 607 and the communication network 608, the computer system 601 may communicate with devices 609, 610, and 611. These devices 609, 610, and 611 may include, without limitation, personal computer(s), server(s), fax machines, printers, scanners, various mobile devices such as cellular telephones, smartphones (for example APPLE® IPHONE®, BLACKBERRY® smartphone, ANDROID® based phones, or the like.), tablet computers, eBook readers (AMAZON® KINDLE®, NOOK® or the like.), laptop computers, notebooks, gaming consoles (MICROSOFT® XBOX®, NINTENDO® DS®, SONY® PLAYSTATION®, or the like.), or the like. In some embodiments, the computer system 601 may itself embody one or more of these devices 609, 610, and 611.

In some embodiments, the processor 602 may be disposed in communication with one or more memory devices 615 (for example RAM 613, ROM 614, or the like.) via a storage interface 612. The storage interface 612 may connect to memory devices 615 including, without limitation, memory drives, removable disc drives, or the like., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, or the like. The memory drives may further include a drum, magnetic disc drive, magneto-optical drive, optical drive, redundant array of independent discs (RAID), solid-state memory devices, solid-state drives, or the like.

The memory devices 615 may store a collection of program or database components, including, without limitation, an operating system 616, user interface application 617, web browser 618, mail server 619, mail client 620, user/application data 621 (for example any data variables or data records discussed in this disclosure), or the like. The operating system 616 may facilitate resource management and operation of the computer system 601. Examples of the operating systems 616 include, without limitation, APPLE® MACINTOSH® OS X, UNIX, Unix-like system distributions (for example Berkeley Software Distribution (BSD), FreeBSD, NetBSD, OpenBSD, or the like.), Linux distributions (for example RED HAT®, UBUNTU®, KUBUNTU®, or the like.), IBM® OS/2, MICROSOFT® WINDOWS® (XP®, Vista®/7/8, or the like.), APPLE® IOS®, GOOGLE® ANDROID®, BLACKBERRY® OS, or the like. The user interface 617 may facilitate display, execution, interaction, manipulation, or operation of program components through textual or graphical facilities. For example, the user interfaces 617 may provide computer interaction interface elements on a display system operatively connected to the computer system 601, such as cursors, icons, check boxes, menus, scrollers, windows, widgets, or the like. Graphical user interfaces (GUIs) may be employed, including, without limitation, APPLE® MACINTOSH® operating systems' AQUA® platform, IBM® OS/2®, MICROSOFT® WINDOWS® (for example AERO®, METRO®, or the like.), UNIX X-WINDOWS, web interface libraries (for example ACTIVEX®, JAVA®, JAVASCRIPT®, AJAX®, HTML, ADOBE® FLASH®, or the like.), or the like.

In some embodiments, the computer system 601 may implement the web browser 618 stored program component. The web browser 618 may be a hypertext viewing application, such as MICROSOFT® INTERNET EXPLORER®, GOOGLE® CHROME®, MOZILLA® FIREFOX®, APPLE® SAFARI®, or the like. Secure web browsing may be provided using HTTPS (secure hypertext transport protocol), secure sockets layer (SSL), Transport Layer Security (TLS), or the like. The web browsers 618 may utilize facilities such as AJAX®, ©HTML, ADOBE® FLASH®, JAVASCRIPT®, JAVA®, application programming interfaces (APIs), or the like. In some embodiments, the computer system 601 may implement the mail server 619 stored program component. The mail server 619 may be an Internet mail server such as MICROSOFT® EXCHANGE®, or the like. The mail server 619 may utilize facilities such as ASP, ActiveX, ANSI C++/C#, MICROSOFT.NET® CGI scripts, JAVA®, JAVASCRIPT®, PERL®, PHP®, PYTHON®, WebObjects, or the like. The mail server 619 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client 620 may be a mail viewing application, such as APPLE MAIL®, MICROSOFT ENTOURAGE®, MICROSOFT OUTLOOK®, MOZILLA THUNDERBIRD®, or the like.

In some embodiments, the computer system 601 may store the user/application data 621, such as the data, variables, records, or the like. (for example, initial or input 3D data, synthesized 3D data, identified ROIs, input specific noise data, GANs model, final synthesized 3D data, down sampled data, AI model data, Eigen values, embedding vectors, a set of classes for identified ROIs, a set of feature vectors, and the like) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (for example XML), table, or as object-oriented databases (for example using OBJECTSTORE®, POET®, ZOPE®, or the like.). Such databases may be consolidated or distributed, sometimes among the various computer systems discussed above in this disclosure. It is to be understood that the structure and operation of the computer or database component may be combined, consolidated, or distributed in any working combination.

As will be appreciated by those skilled in the art, the techniques described in the various embodiments discussed above are not routine, or conventional, or well understood in the art. The techniques discussed above provide for synthesizing the 3D data from input 3D data using GANs. In particular, the techniques discussed above provide for synthesizing unique/rare scenarios for learning. Such rare cases could be defined as a situation or a scenario that could be significantly different from all previously learned data and have minor chances to occur in everyday situations. Thus, for example, such scenarios may not be captured by LiDAR.

The data synthesis device 200, described in the embodiments discussed above, may provide for faster real-time performance of the system due to usage of point cloud data only, thereby reducing the dimensionality. Further, the data synthesis device 200 may down sample high definition final synthesized point cloud data to low definition data by using the down sampling module 205. Moreover, the data synthesis device 200 may be useful in performing 360-degree object detection using the object detection module 206. Conventionally, multiple cameras needed to be fused, which may increase complexity and computational needs for image processing, thereby increasing latency of the system. The data synthesis device 200 may facilitate object detection with less data.

The specification has described method and system for synthesizing 3D data using initial or input 3D data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, or the like, of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for synthesizing three-dimensional (3D) data representing a plurality of possible scenarios from initial 3D data representing a given scenario, the method comprising:
   clustering, by a data synthesis device, initial 3D data to identify one or more regions of interest (ROIs), wherein the initial 3D data represent a given scenario;
   generating, by the data synthesis device, input specific noise data based on the one or more ROIs by an iterative process using Gaussian mixture model; and
   iteratively synthesizing, by the data synthesis device, 3D data based on the one or more ROIs and the input specific noise data using generative adversarial networks (GANs) to generate final synthesized 3D data, wherein the final synthesized 3D data represent a plurality of possible scenarios and are affine transforms of the initial 3D data.

2. The method of claim 1, wherein the initial 3D data are point cloud data acquired by a light detection and ranging (LiDAR) sensor.

3. The method of claim 1, wherein the initial 3D data are high definition data.

4. The method of claim 3, further comprising down sampling the final synthesized 3D data using one or more voxel grid filters.

5. The method of claim 1, further comprising training an artificial intelligence (AI) model with the final synthesized 3D data.

6. The method of claim 5, wherein the AI model is trained for object classification and localization for use in autonomous navigation application.

7. The method of claim 5, further comprising:
   determining Eigen values for the final synthesized 3D data using singular value decomposition; and
   computing embedding vector for the final synthesized 3D data based on the Eigen values.

8. The method of claim 1, wherein generating the input specific noise data comprises:
   computing multi-variate Gaussian distribution of the one or more ROIs based on a set of feature vectors for the one or more ROIs; and
   deriving prior probability for the multi-variate Gaussian distribution of the one or more ROIs based on a set of classes for the one or more ROIs and the set of feature vectors for the one or more ROIs.

9. The method of claim 1, wherein generating the input specific noise data further comprises iteratively back-propagating the 3D data to generate updated input specific noise data.

10. A system for synthesizing three-dimensional (3D) data representing a plurality of possible scenarios from initial 3D data representing a given scenario, the system comprising:
    a data synthesis device comprising of at least one processor and a computer-readable medium storing instruction that, when executed by the at least one processor, cause the at least one processor to perform operations comprising:
      clustering initial 3D data to identify one or more regions of interest (ROIs), wherein the initial 3D data represent a given scenario;
      generating input specific noise data based on the one or more ROIs by an iterative process using Gaussian mixture model; and
      iteratively synthesizing 3D data based on the one or more ROIs and the input specific noise data using generative adversarial networks (GANs) to generate final synthesized 3D data, wherein the final synthesized 3D data represent a plurality of possible scenarios and are affine transforms of the initial 3D data.

11. The system of claim 10, wherein the initial 3D data are point cloud data acquired by a light detection and ranging (LiDAR) sensor.

12. The system of claim 10, wherein the initial 3D data are high definition data.

13. The system of claim 12, wherein the operations further comprise down sampling the final synthesized 3D data using one or more voxel grid filters.

14. The system of claim 10, wherein the operations further comprise training an artificial intelligence (AI) model with the final synthesized 3D data.

15. The system of claim 14, wherein the operations further comprise:
    determining Eigen values for the final synthesized 3D data using singular value decomposition; and computing embedding vector for the final synthesized 3D data based on the Eigen values.

16. The system of claim 10, wherein generating the input specific noise data comprises:
    computing multi-variate Gaussian distribution of the one or more ROIs based on a set of feature vectors for the one or more ROIs; and
    deriving prior probability for the multi-variate Gaussian distribution of the one or more ROIs based on a set of classes for the one or more ROIs and the set of feature vectors for the one or more ROIs.

17. The system of claim 10, wherein generating the input specific noise data comprises iteratively back-propagating the 3D data to generate updated input specific noise data.

18. A non-transitory computer-readable medium storing computer-executable instruction for:
    clustering initial 3D data to identify one or more regions of interest (ROIs), wherein the initial 3D data represent a given scenario;
    generating input specific noise data based on the one or more ROIs by an iterative process using Gaussian mixture model; and
    iteratively synthesizing 3D data based on the one or more ROIs and the input specific noise data using generative adversarial networks (GANs) to generate final synthesized 3D data, wherein the final synthesized 3D data represent a plurality of possible scenarios and are affine transforms of the initial 3D data.

19. The non-transitory computer-readable medium of claim 18, wherein generating the input specific noise data comprises:
    computing multi-variate Gaussian distribution of the one or more ROIs based on a set of feature vectors for the one or more ROIs; and
    deriving prior probability for the multi-variate Gaussian distribution of the one or more ROIs based on a set of classes for the one or more ROIs and the set of feature vectors for the one or more ROIs.

20. The non-transitory computer-readable medium of claim 18, wherein generating the input specific noise data comprises iteratively back-propagating the 3D data to generate updated input specific noise data.

* * * * *